United States Patent [19]

Allen

[11] Patent Number: 5,779,276
[45] Date of Patent: Jul. 14, 1998

[54] LINED PIPE CONNECTOR CONTAINING END RINGS

[75] Inventor: William C. Allen, Pasadena, Calif.

[73] Assignee: Union Oil Company of California, El Segundo, Calif.

[21] Appl. No.: 410,621

[22] Filed: Mar. 24, 1995

Related U.S. Application Data

[63] Continuation-in-part of Ser. No. 68,770, Jun. 1, 1993, Pat. No. 5,405,171, which is a continuation-in-part of Ser. No. 713,551, Jun. 7, 1991, Pat. No. 5,236,231, which is a continuation of Ser. No. 427,758, Oct. 26, 1989, Pat. No. 5,069,485.

[51] Int. Cl.[6] .................................................. F16L 9/14
[52] U.S. Cl. ........................ 285/55; 285/355; 285/112
[58] Field of Search ........................ 285/55, 355, 352, 285/910, 110, 111, 112

[56] References Cited

U.S. PATENT DOCUMENTS

| | | | |
|---|---|---|---|
| 2,805,872 | 9/1957 | Routh | 285/55 |
| 3,142,499 | 7/1964 | Lang | 285/55 |
| 3,284,106 | 11/1966 | McIntosh et al. | 285/55 |
| 3,427,050 | 2/1969 | Krieg | 285/55 |
| 3,472,533 | 10/1969 | Turner | 285/55 |
| 3,596,931 | 8/1971 | Mishler | 285/55 |
| 4,373,750 | 2/1983 | Mantelle | 285/55 |
| 4,883,292 | 11/1989 | Kuroki | 285/55 |
| 5,236,230 | 8/1993 | Mudge, Jr. et al. | 285/55 |
| 5,236,231 | 8/1993 | Allen et al. | 285/55 |
| 5,240,293 | 8/1993 | Allen et al. | 285/55 |
| 5,320,388 | 6/1994 | Laly et al. | 285/55 |
| 5,405,171 | 4/1995 | Allen et al. | 285/55 |
| 5,470,111 | 11/1995 | Nelson et al. | 285/55 |

FOREIGN PATENT DOCUMENTS

| | | | |
|---|---|---|---|
| 2242630 | 3/1975 | France | 285/352 |
| 1012904 | 7/1982 | France | 285/352 |
| 737770 | 9/1952 | United Kingdom . | |

OTHER PUBLICATIONS

How to Design with Gaskets, 4 pages.
Why is Calgraph Flexible Graphite a Superior Gasket Material? 3 pages.
A New Way to Seal Gasket Surfaces That Are Out-of-Flat, 5 pages.

*Primary Examiner*—Eric K. Nicholson
*Attorney, Agent, or Firm*—Gregory F. Wirzbicki; Alan H. Thompson; William O. Jacobson

[57] ABSTRACT

Single or multi-piece, pipe joint seal elements have at least one slidable interface that contacts a sealing surface of an end ring attached to a cementitious pipe liner. The slidable interface allows for slippage between seal pieces and/or seal piece-end ring surfaces during pipe joint assembly and disassembly. The end rings help distribute and minimize rotational and other stresses exerted upon the liner end surfaces and seal pieces. Such end ring surfaces further provide a quality surface for the seal element to effect a seal. The slidable interface seal is especially useful for joining brittle-lined pipe sections handling harsh fluids such as geothermal brine, etc.

12 Claims, 2 Drawing Sheets

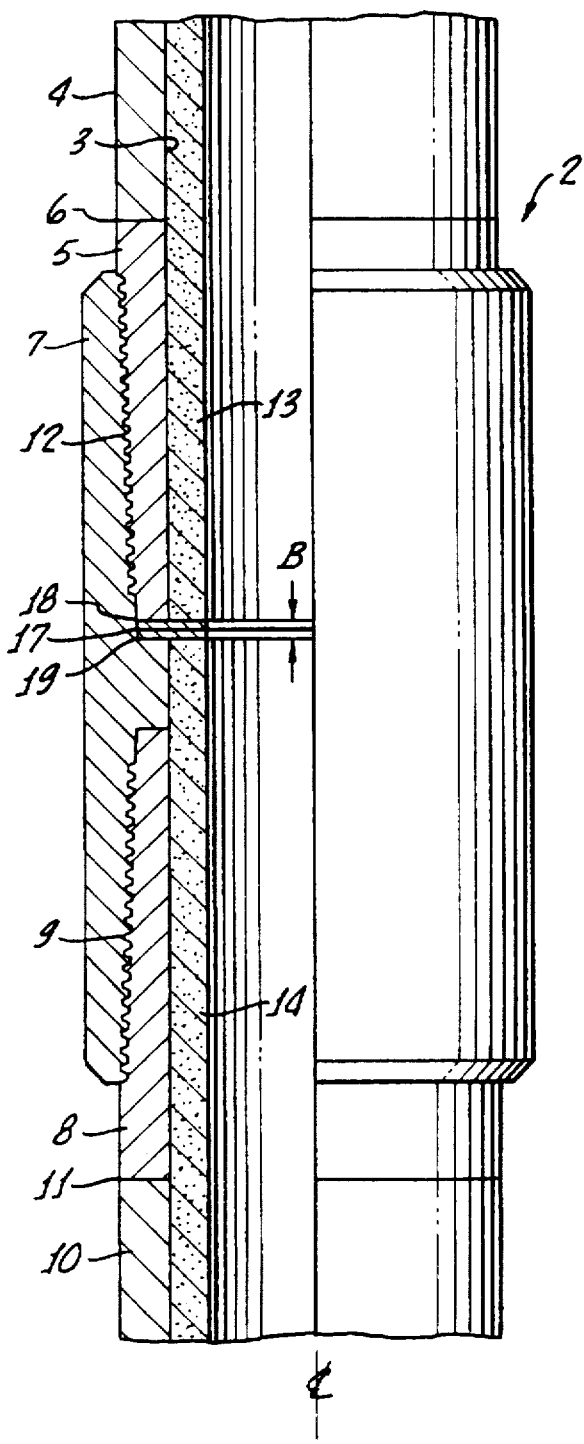
Fig. 1a.
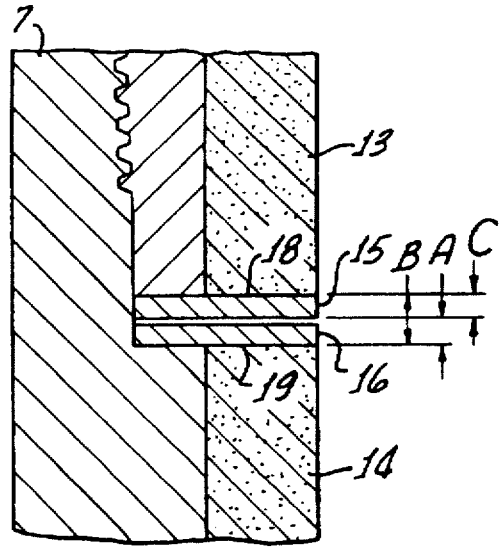
Fig. 1b.
Fig. 2.

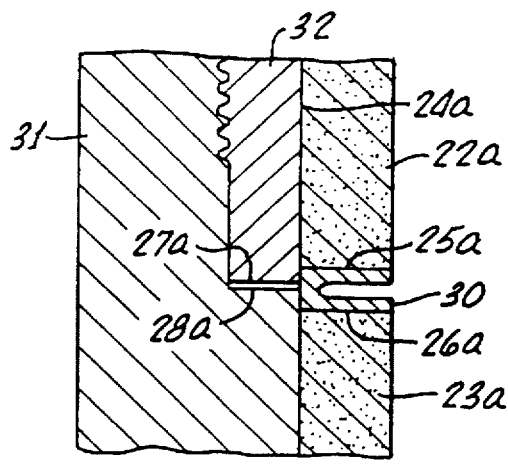
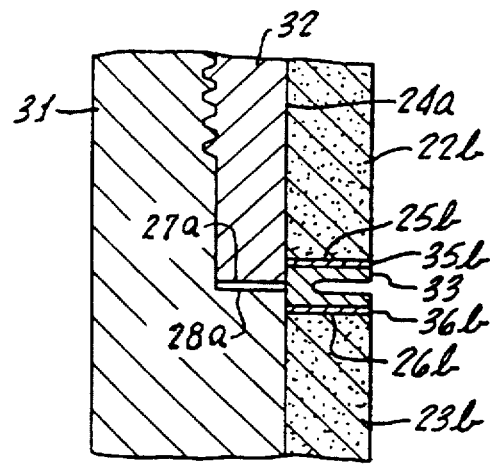
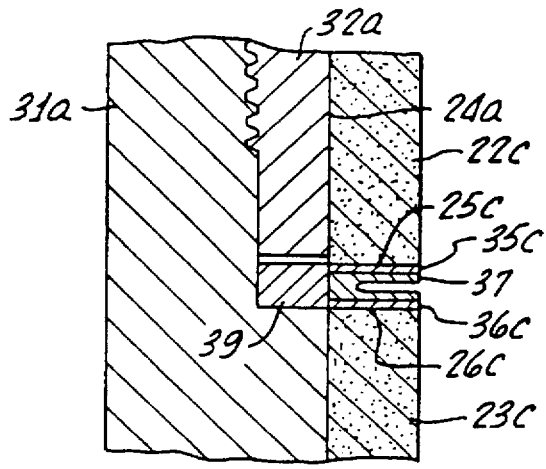
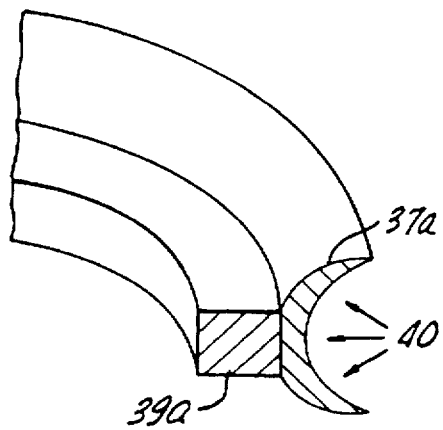

LINED PIPE CONNECTOR CONTAINING END RINGS

CLAIM FOR PRIORITY, INCORPORATION BY REFERENCE

This Application is a continuation-in-part of application Ser. No. 08/068,770, filed Jun. 1, 1993, now U.S. Pat. No. 5,405,171, issued Apr. 11, 1995, which is a continuation-in-part of application Ser. No. 07/713,551, filed Jun. 7, 1991, now U.S. Pat. No. 5,236,231, issued on Aug. 11, 1993 which is a continuation of U.S. Ser. No. 427,758, filed Oct. 26, 1989, now U.S. Pat. No. 5,069,485. All these prior filed applications are incorporated in their entirety herein by reference.

FIELD OF THE INVENTION

This invention relates to piping systems having a brittle liner for containing harsh fluids. More specifically, the invention is concerned with sealing lined pipe at the connectors.

BACKGROUND OF THE INVENTION

Many piping system applications in petro-chemical and other industries involve the handling of corrosive, erosive, scaling or otherwise hard-to-handle fluids. Piping materials that can withstand these fluids can be very costly. One economic approach to handling these difficult fluids is to cover or to line the interior of low cost (non-fluid-resistant) piping with a liner which is fluid-resistant. The low-cost pipe material, such as carbon steel, provides cost-effective structural support for the fluid resistant, but less structurally adequate liner. Even when a liner is composed of fluid resistant materials, more severe applications (such as handling erosive geothermal fluids) tend to erode, chip, spall, crack, pit, and delaminate the lining material, requiring thicker liners. Thin liners may also experience coverage and tool damage problems. One type of cost effective thick liner is composed of a fluid resistant, but brittle material, such as cement.

Lined-pipe connectors typically have a primary seal at a structural interface and a secondary liner seal at a liner interface to prevent fluid from contacting non-fluid-resistant piping materials. The added or secondary liner seal must also be reliable since exposure of the non-fluid-resistant pipe material to the harsh fluids can cause piping failure even if the primary seal does not leak.

Some connectors have significantly loaded liner gaskets or seals that satisfy the need for a reliable liner seal; however, significantly loaded liner seals may not be practical for fragile or brittle liner material. In addition, necessary liner sealing surface preparations (e.g., machining, polishing, grinding, etc.) can impose other unacceptable demands on the brittle liner, resulting in uneconomical consequences.

Some seal elements may require relatively smooth sealing surfaces and tight tolerances (e.g., of a groove dimension). But reliably obtaining these finishes and tolerances for a cast cement liner sealing surface may not be economically feasible, if machined and/or polished after casting.

Creating a reliable liner end seal is particularly challenging when a threaded connector is used. The sealing element must be compressed while at the same time able to tolerate relative rotation of the joint elements (e.g., during threaded joint assembly). Since typical soft elastomeric or plastic materials used for seals, such as synthetic rubbers, have a relatively high coefficient of friction without lubrication and may adhere to sealing surfaces, it is difficult to rotate adhering surfaces without shredding, tearing, abrading, or otherwise damaging the seal or brittle liner—especially when the liner surfaces are soft or rough and unfinished.

None of the current or alternative approaches eliminates the problems of reliable brittle liner sealing without risking damage to the liner and/or the seal. Even if the seal and liner sealing end surfaces are undamaged, the reliability of sealing at these lined joints may be less than desired.

SUMMARY OF THE INVENTION

Briefly, the invention relates to a connector apparatus and its use for sealably joining two oppositely disposed duct-like sections (such as pipe) having spaced-apart sealing surfaces. The connector apparatus normally has a threaded coupling that joins the pipe sections and associated sealing surfaces by rotating either pipe section and concurrently compressing a seal element between the surfaces of the sections. The connector assembly encompasses a unique combination of (1) a fluid-resistant liner covering the interior of the pipe sections, (2) a rigid end ring attached to the end of the liner and having a hard, but smooth sealing surface still capable of mating with a deformable seal element, and (3) at least one deformable seal element capable of being compressed and rotated against at least one slidable interface formed between the seal element and the smooth sealing surface(s) of the end ring.

It has been discovered that smooth, hard, relatively impermeable surfaces of the end rings attached to the liner ends contribute to a highly reliable seal at the liner joints, particularly where single-piece seals (C-ring, hollow O-ring, etc.) contact less than the total potentially available sealing area on the surface of the end ring, i.e., contact at a narrow interface. In one embodiment, a single seal element, i.e., a single-piece seal, abuts the joined pipe liner sealing surfaces, and the slidable interface(s) is (are) located between the seal element and the smooth sealing surface of at least one of the end rings. In another embodiment, the single seal element is an integral portion of a sealing apparatus that combines a landing ring with the seal element. In still another embodiment, two or more seal elements, i.e., a multi-piece seal, abut the joined pipe liner sealing surfaces to form additional slidable interfaces between pieces of the seal.

The seal encompasses, at least in part, deformable and fluid resistant material at the joint interface. The slidable interface allows for rotational slippage of pieces during pipe joint assembly and disassembly, minimizing rotational stresses and strains on the seal pieces and sealing surfaces, e.g., the relatively hard, non-porous and highly smooth end ring sealing surfaces attached to the liner. The flexible material and geometry of a single-piece seal or the multi-piece seal allows for significant seal deformation without sizable loads being placed on the liner, resulting in a highly reliable seal at the liner joints.

The smooth, rigid end ring contains glass or some other relatively inert, electrically resistant and rigid material, which can be cast, bonded, or otherwise fixed or attached at the region of interface with the brittle liner edge. The end ring material is normally harder than the liner material. Also, the region of interface between the attached end ring and liner has at least the same fluid impermeability as the liner material. The highly polished sealing surface of the bonded end ring limits shear stresses and deformations otherwise occurring. The rigid end ring can assist in distributing compressional loads exerted by the seal element themselves upon contact with the end rings. Furthermore, since centrifugally spun pipe liners are often assymetrical with respect to both liner thickness and inside diameter, the attachment of a highly uniform circular end ring enhances the total potentially available sealing area which can be sealably contacted with seal pieces having specified dimensions. Also, in the multi-piece seal embodiment, one of the seal elements may be attached to or captivated by a liner edge for improved seal stability and reliability.

BRIEF DESCRIPTION OF DRAWINGS

FIG. 1a shows a cross sectional and cut away view of a lined pipe joint having a dual-element sliding seal and FIG. 1b shows a cross sectional view of the seal portion of the lined pipe joint;

FIG. 2 shows a cross sectional view of a portion of a lined pipe joint of the invention similar to that portion shown in FIG. 1b but with end rings and abutting pipe sections;

FIG. 3 shows a cross sectional view of a portion similar to that shown in FIG. 2 of a lined pipe joint but having a single piece seal and no end rings;

FIG. 4 shows a cross sectional view of a portion of another lined pipe joint of the invention similar to that shown in FIG. 3 but with end rings; and FIG. 5 shows a cross sectional view of a portion of an alternative lined pipe joint of the invention similar to that shown in FIG. 4 of a single piece seal, liner end rings and a spacing or landing ring.

FIG. 6 is a perspective view of a portion of the sealing apparatus similar to that shown in FIG. 5 of an integrated single piece seal and landing ring.

In these Figures, it is to be understood that like reference numerals refer to like elements or features.

DESCRIPTION OF THE PREFERRED EMBODIMENT

FIGS. 1a and 1b show cross-sectional views of the lined pipe joint and seal portion, respectively, similar to those disclosed in co-pending U.S. patent application Ser. No. 08/068,770, filed Jun. 1, 1993, now U.S. Pat. No. 5,405,171, issued Apr. 11, 1995.

FIG. 1a shows a cross sectional and cut away view of an embodiment of a lined pipe connector apparatus 2. An interior surface 3 of a relatively long first pipe section 4 forms an interior passageway having a centerline axis Lc. The first pipe or duct section 4 is typically comprised of rigid structural material such as carbon steel. The first pipe section may be welded at one end to a rigid pin end assembly or short first end segment 5 at a butt weldment 6. The first end segment may typically be constructed of fluid resistant materials, such as high alloy steels. Attaching alternatives to butt weldment 6 include connecting or attaching means conventionally employed in the art, such as mating threads, cold welding, differential or pressure fitting, adhesive, bolting, pinned connections, and modifications thereof. The end segment 5 and pipe 4 form a pin end assembly which mates to a box end assembly. However, it is preferred that the pipe section and pin end assembly be encompassed by one continuous section.

The box end assembly includes a rigid second end segment 7, such as a ring-like pipe coupling or box end, attached to a third end segment 8 by threaded joint 9. For handling corrosive or other hard-to-handle fluids, the second end segment 7 is also composed of fluid resistant material such as high alloy steel. The third end segment 8 is attached to a duct mating element such as a second duct, e.g., pipe section 10, by butt weldment 11 which is similar to butt weldment 6 or other methods of attachment previously described. The duct mating element can also be an end cap, plug, or blind.

The long cylindrical pipe sections 4 & 10 are of typically conventional structural materials in order to minimize cost, and are covered by fluid resistant liners 13 & 14 to contain hard-to-handle fluids such as geothermal fluids. These piping materials of construction are not generally resistant to corrosive or other attack by many hard-to-handle fluids. However, when applicable, the short end segments 5, 7 & 8 may contain more costly structural materials resistant to these harsh fluids (such as high alloy steels) but this embodiment is not necessarily recommended for cost-effective joints or where galvanic conditions can exist. The end segments 5 & 8 protect the ends of the pipe sections 4 & 10, and the brittle liners 13 & 14 protect the rest of the long carbon steel pipe or duct sections, particularly the interior surface of the duct or duct mating element. The liner material for geothermal applications is typically a cast concrete or cement placed in the pipe as a slurry and spun around the pipe centerline into the shape of liner(s) 13 & 14. The liners substantially cover the interior surface of the passageway formed from the inside surface of the duct or duct mating element exposed to harsh fluids. However, the liner thickness is such as to still allow passage of fluid within the duct. The liners once set are typically brittle, e.g., they may withstand a tensile stress of only about 100 psi, but are more typically capable of withstanding a tensile stress of 1,000 to 2,500 psi. However, the liners are typically capable of withstanding a compressive stress of 10,000 to 25,000 psi, i.e., ten times the tensile stress. The cast concrete is subject to micro-cracking, thereby limiting compressive as well as tensile loading, and the brittle liner ends are susceptible to chipping and/or fragmenting, particularly during field preparation and connector assembly.

The brittle liner 13 may be bonded or sealably attached to both the first pipe section 4 (and the end segment 5) at the interior surface. The bonding of first end segment 5 to first liner 13 serves to seal (or limit exposure of) the carbon steel pipe section 4 from the fluid flowing within any microannulus passageway in the first cylindrical liner 13. The liner-end segment bond may also have to be fluid resistant unless the joint is also sealed at or near the exposed end surfaces at gap 17 having a width distance "B" or less (as shown in FIGS. 1a and 1b). The liner end seal shown in gap 17 comprises a multi-piece seal, e.g., gasket elements 15 & 16 or 45 and 46 (as shown in FIGS. 1b or 2, respectively), or a single-piece seal, e.g., a C-ring-type element 30, 33, 37 and 37a (as shown in FIGS. 3, 4, 5 and 6, respectively).

A second brittle liner 14 is similarly attached or bonded to both the second pipe section 10 and the third end segment 8. The bonding of second liner 14 again may form a fluid seal between the second liner 14 and the third end segment 8 preventing fluid from contacting the second pipe section 10 (similar to the first end segment 5 and first liner 13 bonding).

The opposing end sealing surfaces 18 & 19 of the end segments 5 & 8 and/or liners 13 & 14, when mated or joined, form a ring-like cavity or gap 17. The opposing surfaces 18 & 19 are shown generally planar and perpendicular to the centerline. Alternatively, the opposing surfaces 18 & 19 may form a ring-like cavity having a stepped, V-shaped, or other cross-sectional shape. Placing the V-shaped (or similar) cross-section so it is pointed radially inward may help contain extrusion tendencies of a seal material during compression, but may tend to unbond the liner from the pipe or cause the liner to fail.

The brittle liners 13 & 14 typically contain an hydratable cementitious materials, e.g., Portland cement blended with silica flour, or a polymer concrete. The sealing surfaces 18 & 19 of a cementitious liner may be irregular or rough which can be difficult to seal, even with a deformable seal. Concrete surfaces may also be porous with limited permeability, making sealing with a deformable seal still more difficult. The radial thickness of the cementitious liner is at least 0.32 cm (⅛ inch). However, the radial thickness is a function of pipe size, liner materials, fluid properties, etc., and other thicknesses may be appropriate for different embodiments and application as per American Petroleum Institute "Recommended Practice for Application of Cement Lining to Steel Tubular, Good, Handling, Installation and Joining" which is herein incorporated by reference in its entirety.

In order to perform more effectively, a liner seal element located between the liner end surfaces of a threaded, brittle-lined pipe joint should form a fluid barrier (i.e., fluid impermeability), be fluid-resistant, be slidable as the threaded joint is engaged (and rotated) during assembly, be easily deformable to limit sealing loads on the brittle or fragile liners 13 & 14, and be somewhat resilient to accommodate fluctuations in gap width. A "fluid-resistant" material is defined, for the purposes of this invention, as a material able to withstand the corrosive, erosive or other deleterious effects of the flowing fluids within the pipe sections for the period of the material's intended use. Without the fluid-resistant liner seal, harsh fluids would attack the structural non-fluid-resistant material of the piping (e.g., as in the case of liner unbonding or in the use of non-alloyed sections).

The cementitious sealing surfaces 18 and 19 can have a rough surface finish as cast, making it a difficult-to-assemble and to seal surface. The surface finish can be improved by machining and polishing these rough and irregular surfaces. Rough surfaces can be sealed by graphite gaskets or other highly compressible materials; however, if greater reliability is desired, the surfaces must be machined or otherwise trued and smoothed prior to use of the gaskets.

The multi-element liner end seal elements are shown in FIG. 1a as just contacting the liner and segment end surfaces 18 & 19, and contacting, but uncompressed by these surfaces in FIG. 1b and 2. In FIG. 1b, the end surfaces 18 and 19 are separated by a distance "A" when the liner seal is fully compressed and by distance "B" when just contacting the liner seal, but not compressing it. Compression is achieved by squeezing and rotating the threaded pipe sections 4 & 10 and accompanying respective end segments 5 and 8 together. The space between the liner seal elements 15 & 16 is shown in FIG. 1b for clarity in identifying each seal element, but the liner seal elements would be contacting each other as well as the liner end surfaces 18 & 19 when the end surfaces are separated by distance "A" or "B."

The multi-element gasket (seal elements 15 & 16) is usually a graphite material, but may also contain other deformable materials, such as elastomeric, fluid-resistant metallic or soft or reinforced plastic materials, having at least partial resiliency after deformation and lubricity to achieve a slidable interface. The sealing loads developed with the deformed material are limited by compressing both seal elements only over a compressing distance equal to distance "C" which is equal to contact distance "B" (when seal is initially contacted) less final gap or distance after compression "A." The preferred compressing distance "C" is generally no more than about 40 percent of contacting distance (or original total thickness) "B" for flexible graphite gaskets in thick cement-type liners, but the compressing distance "C" can be a larger range for other applications and dependent upon seal element characteristics. More typically, compression is at least about 20 percent. Compressing the expanded graphite gaskets up to 40 percent can typically result in axial strains of as much as $3000\times10^{-6}$ inch/inch, but may be as little as $200\times10^{-6}$ inch/inch. For a reduced (expanded graphite) compression, the strains are typically reduced from this range.

Either or both of the deformable liner seal elements 15 and 16 may be bonded or attached to the end surfaces 18 and 19, respectively. Even if not bonded, the rough and porous surface of either liner ends 18 or 19 tends to mechanically adhere to the respective seal elements 15 and/or 16 at these contacting surfaces. The seal-to-liner adherence prevents or limits differential movement at these contacting surfaces when the pipe sections are threadably rotated to accomplish the desired compression of the gasket during joint makeup.

Differential movement or sliding during threaded rotation can be achieved at the seal element 15 to seal element 16 interface. Sliding capacity at this slidable interface can be enhanced by the application of lubricants, but the lubricity of the preferred graphite materials of construction allows compression and sliding without added lubrication.

In the connector shown in FIGS. 1a and 1b, the gaskets 15 and 16 also form a redundant fluid seal between the opposing surfaces of the metallic end segments as well as the liners. The squeezing by the metal segments also anchors the gaskets. This redundancy of sealing and anchoring may further assure the reliability of sealing in a harsh environment. However, compression may be limited by the induced loads placed upon the brittle liner.

FIG. 2 shows a cross sectional view, similar to the view shown in FIG. 1b, of an interface portion of a connector apparatus of the invention. The lined pin end 32 and lined box end 31 pipe sections can abut at opposing pipe end surfaces 27 and 28, respectively, are of similar configuration to the lined high alloy end segments shown in FIG. 1a, and can contain non-fluid resistant structural materials, such as a carbon steel or other conventional materials, that require a primary seal at the mating liner end surfaces. A primary seal, as used herein, is a fluid barrier that is expected to function in the absence of other seals, whereas a secondary seal may not function in the absence of other seals, e.g., a joint gap filled with a putty (secondary seal) may be blown out upon loss of a primary seal at the joint.

In FIG. 2, the metal piping interior or passageway 24 of the pin end 32 and box end 31 pipe sections have liners 22 and 23 which do not extend to entirely cover the interior passageway 24, i.e., the liner ends are setback surfaces 25 and 26 to allow placement of end rings 35 and 36. Although the passageway 24 is shown extending in both pipe sections, the passageway may not be present in one or both portions of the joint, e.g. an end cap. If end rings 35 and 36 are not present, the setback of the liner end surfaces 25 & 26 prevents excessive compression (including rotational compression or shear stress) of the dual element seal (45 & 46) between the liner end surfaces. However, the use of glass or other rigid, smooth-surfaced end rings 35 and 36 provides more suitable end surfaces to seal against, provides smooth end surfaces for improved sliding capacity at the end ring-gasket slidable interface (particularly during threaded rotation), and allows high compression. In essence, the placement of both end rings 35 and 36 provides (at least) three slidable interfaces (particularly rotational slidability) for the joint apparatus, including 1) the interface 50 of the sealing surfaces of end ring 35 and seal element 45; 2) the interface 51 where seal elements 45 and 46 contact each other; and 3) the interface 52 of the sealing surfaces of end ring 36 and seal element 46. Alternatively, only one of the liner ends may be setback which allows placement of only one end ring 35 or 36. Thus, even if the opposing pipe end surfaces 27 & 28 are abutting, the set back of the liner end surfaces 25 and/or 26 allows placement of end rings and/or limits the liner end compression of either dual or single seal elements. Furthermore, if either seal element 45 or 46 adheres to respective contacted liner end surfaces 25 or 26 (or preferably to respective non-setback liner end surfaces located in the same manner as liner end surfaces 18 or 19 in FIG. 1b), at least two slidable interfaces are still present, e.g., interfaces 50 and 51, or interfaces 51 and 52.

The dual seal element (45 & 46) is also anchored and forms a redundant seal at the metallic pin and box end surfaces 27 & 28 when extended in a similar manner as dual seal elements 15 and 16 as shown in FIG. 1b. Because the metal pipe can typically withstand much larger stresses and is no longer limited by the loads on the brittle liner, compression may be increased at the metallic interface (i.e., 27 and 28), thus anchoring the seal and producing a more reliable liner seal.

FIG. 3 shows a cross sectional view of an interface portion of a conventional connector apparatus similar to the view shown in FIG. 2, but without end rings 35 and 36. Also, the pin end 32 and box end 31 metal pipe sections are threadably attached similar to the corresponding pipe sections shown in FIG. 2, but the pipe does not directly compress the single-piece C-ring seal element 30. The interior pin end 32 and box end 31 pipe sections have liners 22a and 23a which are recessed and do not extend to entirely cover the interior 24a of the pipe sections, similar to that shown in FIG. 2. The liner recess or setback from nose and/or shoulder of the pin and box ends, respectively, again prevents excessive (rotational) compression of the single element seal (30), even when the opposing pipe end surfaces 27a & 28a abut. Although the single-element C-ring seal is no longer anchored by pipe end compression, abutting pipes or shouldering result in joint regularity and a more repeatable and consistent compression of the seal. The single-seal element 30 may also be attached to one of the liner end surfaces 25a or 26a, if anchoring is required. Alternatively, the joint could shoulder the seal at a different point and still trap or anchor the C-ring seals between the pipe nose and shoulder ends. As illustrated hereinafter in Table 2, in this embodiment the C-seals may extrude or warp prior to or during the achievement of a suitable compression, may extrude or leave the groove or gap, or their springs may be crushed and/or the brittle cement liner may fail, e.g., crushed or scored. Such data in Table 2 indicates the consequential unsuitable leakage resulting from failure of such a joint apparatus.

However, FIG. 4 shows a cross sectional view of an interface portion of a single piece seal with end rings attached to a liner in a preferred embodiment connector apparatus of the invention. The pin end 32 and box end 31 pipe sections are threadably attached similar to the pipe sections shown in FIG. 3. The interfacing portions of the pin end 32 and box end 31 pipe sections have liners 22b and 23b one or both of which are setback (i.e., recessed) and do not extend to entirely cover the interior 24a of the pipe sections. The liner end surfaces 25b & 26b in FIG. 4 are set back further than shown in FIG. 3, which allows end foils or end rings 35b & 36b to be bonded to the liner end surfaces 25b & 26b. A similar compression of the single element C-ring seal 33 can be achieved between the end rings 35b & 36b, but a greater compression stress without liner damage may be possible if the structural soundness of the end rings is such that they carry or distribute the load uniformly across the liner end surface.

The set back distance of one or both of the end rings 35b & 36b from the pipe end surfaces is selected to again prevent excessive compression or stress on the C-ring sealing element 33 and/or the liners. Thus, even when the opposing pipe end surfaces 27a & 28a abut, the set back of the liner end surface(s) 25b and/or 26b and thin end rings 35b and/or 36b results in a predictable optimal compression of the single C-ring sealing element 33 (based upon a given total thickness).

The end rings 35a & 36b also provide finished or otherwise smoother sealing surfaces contacting the single C-ring sealing element 33 when compared to the rough concrete liner end surfaces 25b & 26b. The end rings 35a and/or 36b typically contain a rigid, relatively impermeable, structurally sound, and fluid-resistant material, such as glass or a polished high alloy (if galvanic corrosion is not anticipated). However, it is preferred that the end rings contain essentially material which does not induce or promote galvanic corrosion. Examples of materials useful in end ring construction include metals (and metal alloys), amorphous materials such as glasses (including metallic glasses), crystalline non-metallic materials such as minerals (e.g., quartz, etc.) and refractories such as ceramics, refractory oxides, including those of silicas, aluminas, titanias, chromites, and sintered carbides and nitrides, etc.

In general, the end rings are an integral part of the liner so that the movements of the liner and the attached end ring are identical. Any attachment or contact of the end ring (35 and/or 36) to the non-fluid resistant portion of the duct (i.e., carbon steel pipe Sections 31 and 32) should not impede the movement of the liner and end rings to cause separation of the end ring from the liner. Although the end ring is an integral portion of the liner during use, the end ring is fully independent from the duct mating element, duct-like sections, i.e., non-fluid resistant pipe, etc. The bond formed to attach the end ring to the liner should be as fluid resistant as the material contained in the liner. It is preferred that the surfaces of the end ring be treated or textured (chemically and/or mechanically etched, etc.) prior to attachment to the liner to facilitate adherence of the end ring to the liner. The end rings may be attached during the casting of the liner or thereafter. Alternatively, a stable, fluid-resistant adhesive can be applied at the interface between the cured concrete liner end surface (usually cast or machined) and the attaching end ring surface. If an electrically conductive alloy ring material is selected (e.g., a material which may cause or allow for galvanic corrosion), the end ring should be electrically isolated from the non-fluid resistant pipe section material which would otherwise be sacrificed if fluid should penetrate the seal.

The lateral thickness of the end rings range from that of a relatively thin body covering the liner end surface, such as provided by a foil, to that of a body exhibiting significant mechanical strength, so as to require recessed or set-back distances of at least 0.5, and preferably at least 1 centimeter, but usually not thicker than 25 percent of the longitudinal axis of the protected duct or duct-like sections. The radial thickness of the end ring is normally at most that of the radial width of the cement liner; however, the sealing surface of the end ring mating with the seal element may be such that the radial width of the end ring can be less than that of the cement liner. Although generally seal design dependent, the actual contact area on the surface of the end ring is often in a range from about 20 to about 80 percent of the total available sealing area defined by the liner end surface (total interface area), particularly in single-piece seals. In the case of the gasket-type flat-surfaced seal elements, the contact area is preferably about 50 to 100 percent of the total available sealing area; however, in the case of specialty seals which can be selectively loaded, the contact area is preferably about 5 to about 50 percent of the available sealing area.

The end ring can be attached to or incorporated into the end surface of the fluid-resistant liner during or after formation of the liner. During fabrication of the liner (such as by centrifugal casting techniques), an end fixture (e.g., molding) can be used to simultaneously hold the end ring in place and retain lining material (e.g., cement or concrete) prior to, during, and/or after casting. The end ring can be attached to the end fixture using an adhesive (such as grease), or vacuum techniques, while the desired geometry of the liner end is created. During or after the liner hardens or cures, the end fixture can be removed in a manner such that the end ring is left bonded to the liner end surface. Other processes combined to obtain the surfaces onto which the end rings are attached may include machining, rolling, grinding, honing and stamping.

FIG. 5 shows a cross sectional view of an interface portion of a single element seal comprising a deformable C-ring sealing element 37 and a landing ring 39. The deformable C-ring sealing element 37 preferably contacts the landing ring 39, but these elements may also be spaced apart. In a preferred embodiment, a single piece sealing element, such as C-ring sealing element 37 (or dual gasket seals similar to gaskets 45 and 46 of FIG. 2), can be attached or integrated with a landing ring, such as landing ring 39, to form and be utilized as a single element seal unit. The pin end 32a and box end 31a pipe sections are threadably attached similar to the pipe sections shown in FIG. 4. The internal surfaces 24a of the pin end 32a and box end 31a pipe sections have covering liners 22c and 23c one or both of which protrude or extend up to or beyond (as shown) the pipe section as well as partially and/or entirely covering the interior passageway. For the thicker landing ring shown in FIG. 5, the protrusion of end rings 35c and 36c attached to the respective liner end surfaces 25c & 26c allows the metal pipe sections to contact and seat on the landing ring 39 while simultaneously compressing the deformable C-ring sealing element 37. Other embodiments, e.g., using a landing ring thinner than the sealably compressed thickness of the C-ring 37, may preferably have one or both of the liner end surfaces 25c and/or 26c (and respective end rings 35c and/or 36c) set back while the pipe ends contact the thinner landing ring to achieve similar compression of the C-ring sealing element 37 without the risk of damage to a protruding brittle liner.

The landing ring 39 prevents excessive (rotational) compression on the single element seal (37) and compressional stress upon the liner and end ring. When the pipe end surfaces abut the landing ring 39, the liner end surfaces 25c & 26c (including respective end rings 35c and/or 36c) are compressionally stressed a predetermined and known amount for a specific total thickness of the C-ring seal element 37.

FIG. 6 shows a combined seal element/landing ring apparatus having a landing ring portion 39a thinner than the sealably uncompressed thickness of an integrated seal element portion, e.g., C-ring 37a. However, the C-ring seal element portion 37a may be attached (or integrated) to a thicker (or same thickness) landing ring portion 39a, particularly when the end rings extend the liner end surfaces. Aside from preventing excessive compression of the element when the pipe end surfaces abut, the integrated landing ring provides a counter-balancing force (i.e., "back-up") to the force resulting from pressures shown generally as 40 in FIG. 6 that are exerted upon the interior-side surfaces of the seal element by the fluids contained in the interior passageway.

Several slidable interfaces may be present in the embodiment of FIG. 5. When the pipe sections are rotated with respect to each other, the single piece seal-to-end ring and single piece seal-to-landing ring interfaces (if contacting) may slide against each other. Although landing ring sliding typically requires the landing ring-to-seal element contacting surface to be smooth or lubricated, the landing ring surface that backs up seal element 37 can more effectively prevent extrusion of the seal element if the landing ring and sealing element(s) are integrated as a single piece unit. The integration of spacing or landing rings with single-piece seal elements can readily provide additional support and control of the seal element during joint assembly and particularly the compression of the joint axial.

A redundant seal may again be formed by the landing ring assembly shown in FIGS. 5 and 6. Although the landing ring provides for joint torque requirements if shouldering does not occur elsewhere, the landing ring 39 (or 39a) and single seal element 37 (or 37a) may also redundantly seal at this interface. Thus, reliability of the seal is enhanced.

The nominal radial width of the gaskets 15 & 16 or 45 and 46 (and liner) in the embodiment shown in FIG. 1b and 2 is approximately ¾ inch (1.905 cm), but may typically range from about 1/32 to 1 ¼ inches (0.07938 to 3.175 cm), depending upon the liner dimensions. Although substantially equal gasket thicknesses are shown in FIG. 1b, the nominal axial or lateral thickness of each of the dual gaskets may range from about 1/32 to 1/8 inches (0.07938 to 0.3175 cm) resulting in a total axial thickness of the seal (prior to compression) of about 1/16 to ¼ inches (0.1588 to 1.270 cm). In the single piece seal embodiments shown in FIGS. 3–6, the total axial thickness (prior to compression) is usually from about 1/16 to ½ inches (0.1588 to 0.635 cm). Although usually dependent upon connector design and piping sizes, the nominal landing ring radial width is, for example, approximately 1/8 to ¼ inch (0.3175 to 0.635 cm), and the nominal axial or lateral thickness of the landing ring is approximately 0.1–0.3 inches (0.254–0.762 cm) for a 1/8–3/8 inch total thickness single-piece sealing element or dual gasket (1/16–3/16 inch each) at about 30 percent compression.

The multi-piece seals are fluid resistant seal types that are capable of having at least one slidable interface between the seal elements themselves, for example, at least two gaskets having flat configurations. The preferred single-piece seals are fluid resistant seal types that are capable of having slidable interfaces with a smooth sealing interface of an end ring, such as gaskets, flexible metallics, plastic spring loaded seal elements, radial metallics (or toggles) and metallic boss seal elements. Example configurations of single-piece and multi-piece seals (or modifications thereof) include: C-rings, hollow O-rings, jacketed gaskets, spiral wound gaskets, molded shape gaskets, K-seal flexible metallics, Del Tau C flexible metallics, Del Tau E flexible metallics, Haskel flexible metallics, Big Edge flexible metallics, Pressure Lock flexible metallics, Hydrodyne flexible metallics, Vee flexible metallics, Naflex flexible metallics, Pneuflex flexible metallics, Bar-X flexible metallics, Nucoseal flexible metallics, Omega flexible metallics , Sealol 1200 flexible metallics, Bal-Seal plastic spring loaded, Omniseal spring loaded, Raco spring loaded, Creavy spring loaded, Tec Ring spring loaded, Bobbin toggles, Canoseal toggles, Gamah toggles. Infundibular metallic bosses, Nutor Q metallic bosses, and modifications thereof. The multi-piece or single-piece seal types can typically include those disclosed in the *Aerospace Fluid Component Designers Handbook*, Volume 1, Revision D, (1970) by TRW Systems Group, particularly Section 6-Modules, and more particularly Section 6.3-Static Seals, the disclosure of which is incorporated by reference in its entirety herein. Table 6.3.3.1 of said Handbook describes several seals and configurations of seal types which one of ordinary skill in the art may employ, or modify, for purposes of the present invention. Also, the relatively smooth sealing surface of the end rings disclosed herein typically have a surface roughness less than about 20, and preferably less than about 10, as determined by the roughness height ratings described in said Handbook, more particularly in Table 6.3.2.1.c.

The liner seal material may be non-metallic or metallic, although non-metallic materials, such as elastomers and plastics, are preferred. Normally non-fluid-resistant liner seal material is coated, or otherwise treated or modified so as to function in a fluid-resistant manner when employed in the invention. A highly preferred liner seal material of construction is a flexible or expanded graphite, such as Calgraph®, B grade, supplied by Pacific Mechanical, Inc. located in Santa Fe Springs, Calif., and Graphoil, supplied by Union Carbide Inc. Alternative materials of construction which would typically not require lubricant at the seal-to-seal or seal-to-end ring sliding interface include: Teflon (for less elevated temperature applications), reinforced Teflon or Teflon coated elastomers, alloys (for loading purposes) and nylon (for less hard-to-handle fluids). The seal materials may include a lubricant. Typical properties of the flexible graphite material are listed in Table 1.

TABLE 1

TYPICAL PROPERTIES-EXPANDED/FLEXIBLE GRAPHITE

| PROPERTY | UNITS | VALUE |
| --- | --- | --- |
| Resistivity | OHM-IN. parallel/ perpendicular to surface | 0.004/0.025 |
| Bulk Density | lb/FT$^3$ (gm/cc) | 70.0(1.1) |
| Thermal Conductivity | BTU-in/hr-ft$^2$-°F. | 1532 |
| Thermal Expansion | 10$^{-6}$/°F. | 2.8–4.4 |
| Hardness | Shore Scleroscope | 30–40 |
| Tensile Strength | psi | 700 min |
| Permeability of Air | cm$^2$gm | <0.00001 |
| Emissivity at 932° F. | - | 0.4 |
| Sublimation Temp. | °F. | 6600 |
| Temp. Limit (in air) | °F. | 1000 |
| Coef. of Friction (against steel) | - | 0.05 |

Reliable sealing can be obtained from such graphite sealing elements even where the tolerances on dimension "C" (as referred to in FIG. 1b) are large, the liner/pipe segment end surfaces are misaligned, the liner is partially unbonded and the liner end surface is very rough, e.g., as conventionally cast. This improved sealing reliability is primarily due to the large compressibility of the flexible seal elements. As the seal element(s) is (are) compressed, the large compressibility allows the deformable material to fill in irregularities found on rough liner end surfaces as well as form a tight seal with the smooth sealing surface of the end ring. The compressibility also minimizes the adverse effects of sealing due to misalignment or reduced compression distance caused by dimensional tolerance variations. Although the compressibility of the deformable seal elements is theoretically unlimited, a typical seal element material has a minimum compressibility of at least about 5% while retaining a resilience or recovery of at least about 90% and a creep relaxation of no more than 5% is preferred.

The low permeability of the sealing material and/or the end ring material further assists in obtaining a reliable seal. Although the permeability of the deformable seal elements or end ring material is theoretically unlimited, a minimum permeability of no more than that of the liner is acceptable (typically less than about 0.01 Darcy is preferred). For sealing against an end ring, a permeability of no more than about 10 percent of that of the liner is more preferred, and a permeability of no more than about 1 percent of the liner is still more preferred.

Another important property of the liner end seal material (used with or without a lubricant) is its intrinsic lubricity and/or coefficient of friction against itself or against the smooth end ring sealing surface. Although the seal material coefficient of friction against itself or against the smooth end ring sealing surface is less than 0.3 without the use of a lubricant, more preferably no more than 0.1 without lubricant, and still more preferably no more than about 0.05 without added lubricant, this property can typically range from as little as about 0.01 (with lubricant) to as much as about 0.7 (without lubricant).

In the preferred embodiment for geothermal applications, the liner, end ring and seal element materials must all be fluid resistant. It is preferred that such materials be able to withstand fluid temperatures up to about 700° F. (371° C.), pressures up to about 6,000 p.s.i.g. (414 atmospheres), salinities up to saturation or about 30 percent, fluid pH as low as about 2 and as high as about 8, and a fluid velocity up to about 200 feet per second or fps (60.96 meters per second), although velocities approaching 330 meters per second have been contemplated. Normally the materials used herein should withstand temperatures in the range from about 475° F. to about 575° F., pressures from about 500 to about 1,600 p.s.i.g., and fluid velocities from 1 to about 15 feet per second. The liner seal must withstand these conditions without significant loss of resiliency, and without shrinkage, swelling, and/or long term degradation.

Each of the single piece or multi-piece seals may be formed using laminated ring construction. The plurality of layers may include an alloyed metallic layer imbedded in layers of fluid resistant sealing materials, such as flexible graphite, Teflon reinforced Teflon, or other deformable materials described herein. The metallic layer provides a ring-like reinforcement of other sealing layer materials. The layered construction may provide multiple slidable interfaces if the layers are not bonded to each other.

The invention satisfies the need to provide sealed connectors which can structurally and environmentally withstand severe environments at minimal cost. The process of using these internally sliding sealed connectors is to place at least one deformable seal element (single or multi-piece) proximate to a liner end having a reinforced, relatively impermeable, smooth and rigid end ring sealing surface and compress the seal using a mating joint element. The mating joint element is commonly rotated by hand or assisted with engaging tools providing proper torque requirements, i.e., wrenches, etc. When the mating joint element is rotated and the seal element compressed, the seal design precludes sliding or sliding damage at the seal-to-liner end (e.g., seal-to-end ring sealing surface) interfaces, respectively, such as when joint ends are threadably joined. In one embodiment, the seal elements are also compressed by opposing structural pipe surfaces to form a redundant pipe and liner seal which anchors the seal. The use of low cost threaded piping with a brittle liner and deformable seals, such as dual gaskets, C-rings, hollow O-rings, etc., achieves a reliable and low cost sealed joint. The joint, end rings, and seals may also be reusable.

Another advantage of the invention process and apparatus is avoiding the potential for galvanic corrosion. The high alloy end segments shown in FIG. 1a may encourage galvanic corrosion at a weldment or other attachment to the carbon steel pipes. However, the embodiments which seal in the absence of the high alloy end segments or other dissimilar metals avoid the potential for galvanic corrosion.

The invention is further described by the following sample test data summarized in Table 2.

TABLE 2

SEAL COMPRESSION TEST DATA

| SEAL ARRANGEMENT | LUBE | RECESS | FINAL CONDITION |
|---|---|---|---|
| 2 × 1/32 Graphite | None | Flush | Crimpled at 60% |
| 2 × 1/16 Graphite | None | Flush | Crimpled at 47% |
| 2 × 1/8 Graphite | None | Flush | Opened at 50% |
| 1/4" C-seal | Red | 0.160" | extruded at 20% |
| 3/16" C-seal | Red | 0.160" | left groove |
| 3/16" C-seal | Red | 0.160" | Springs crushed & cement failed |

The data in Table 2 are illustrative of specific modes/tests of the compression boundaries of conventional embodiments. The sample data on the joint were derived from the testing of an instrumented 9 5/8 inch nominal diameter, lined-pipe, fitted with a threaded connector and having liners of average radial thickness approximately 1/8 inch. The instrumentation recorded testing temperature, pressure, loads, strain, leakage, and a video record of seal element behavior including motion was made during assembly. The data in Table 2 indicate the general failure of the C-seal configurations when no end rings are present.

However, in the presence of end rings having smooth glass sealing surfaces and attached to lined-pipe comparable to that of Table 2, either lubricated or unlubricated C-seal arrangements exhibit undamaged seal elements during assembly. C-seal configurations (1/4 inch and 3/16 inch) in contact with the rigid, smooth (roughness height rating of less than 10) end ring sealing surfaces (approximately 0.5 cm thick glass) provide essentially no leakage at the thread joint seal.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed:

1. A connector apparatus for containing a fluid, the apparatus comprising:
    a duct having an interior passageway;
    a rigid end ring element attached proximate to at least one end of a brittle liner substantially covering said interior passageway, said end ring element having a first sealing surface;
    a duct mating element having a second sealing surface which is substantially opposingly located from said first sealing surface when said duct is joined to said duct mating element;
    means for joining said duct and said duct mating element while compressing a seal located between said sealing surfaces and while rotating said duct relative to said duct mating element; and
    at least one deformable seal element compressed between said first and said second sealing surfaces, said deformable seal element having a sealing surface slidably contacting said first sealing surface at a slidable interface wherein a landing ring is located between said duct and said duct mating element.

2. A connector apparatus for containing a hard-to-handle fluid, the apparatus comprising:
    a first pipe section comprising a non-fluid resistant material and having an interior surface forming a passageway;
    a fluid-conducting liner comprising a brittle fluid resistant material substantially covering the interior surface of said pipe section, the liner having a surface proximate to one end of said first pipe section, said liner comprising a rigid end ring element at least partially covering said surface to form a first sealing surface and attached to said liner;
    a second pipe section having a second sealing surface which is substantially opposingly located from said first sealing surface when said pipe sections are joined;
    a means for joining said pipe sections to produce compression of a deformable seal between said first and second sealing surfaces and to produce rotation of the first pipe section relative to the second pipe section; and
    one deformable seal element forming a deformable seal compressed between said first and second sealing surfaces, said compressed deformable seal elements slidably contacting said first sealing surface at a slidable interface wherein a landing ring is located between said first and said second pipe sections.

3. The apparatus of claim 2 wherein said landing ring is integrated with said deformable seal element.

4. A connector apparatus for containing a hard-to-handle fluid, the apparatus comprising:
    a first pipe section comprising a non-fluid resistant material and having an interior surface forming a passageway;
    a fluid-conducting liner comprising a brittle fluid resistant material substantially covering the interior surface of said pipe section, the liner having a surface proximate to one end of said first pipe section, said liner comprising a rigid end ring element at least partially covering said surface to form a first sealing surface and attached to said liner wherein said rigid end ring element has at least one non-shape property different from a non-shape property of said liner;
    a second pipe section having a second sealing surface which is substantially opposingly located from said first sealing surface when said pipe sections are joined;
    means for joining said pipe sections to produce compression of a deformable seal between said first and second sealing surfaces and to produce rotation of the first pipe section relative to the second pipe section; and
    one deformable seal element forming a deformable seal compressed between said first and second sealing surfaces, said compressed deformable seal elements slidably contacting said first sealing surface at a slidable interface wherein said compressed deformable seal contacts less than 80 percent of the area of said first sealing surface.

5. A method for sealably joining two duct-like sections, each having their interior passageways substantially covered with a fluid-resistant brittle liner, wherein each of said sections having generally opposing and spaced apart sealing surfaces of their respective liners when said duct-like sections are joined, said method comprising:

placing at least one deformable seal element and at least one end ring comprising rigid material between said opposing sealing surfaces and attaching said end ring to one of said sealing surfaces to at least partially cover said sealing surfaces of the liners, wherein said seal element and end ring contact each other at a slidable interface, wherein at least one sealing surface on said seal element is capable of rotating with respect to said end ring when said seal element and said end ring are squeezed together; and squeezing together and rotating one of said sealing surfaces with respect to the other sealing surface, wherein said squeezing and rotating compresses and slides said seal element and said end ring at said slidable interface.

6. The method of claim 5 wherein said slidable interface is lubricated.

7. The method of claim 5 wherein one of said duct-like sections comprises a threaded surface and the opposed duct-like section comprises a mating threaded surface and said threaded surfaces are engaged during said rotating.

8. The method of claim 7 wherein said seal element is a single seal element selected from the group of fluid resistant seal types consisting of gaskets, flexible metallics, plastic spring loaded seals, radial metallics, and metallic bosses.

9. The method of claim 5 wherein said deformable seal element is a single seal element and said fluid-resistant liner comprises a cementitious material.

10. The method of claim 9 wherein said cementitious material comprises hydrated Portland cement and said seal element has a C-ring configuration.

11. A connector apparatus for containing a fluid, the apparatus comprising:

a duct having an interior passageway;

a rigid end ring element attached proximate to at least one end of a brittle liner substantially covering said interior passageway, said end ring element having a first sealing surface and wherein said end ring element has at least one non-shape property different from a brittle liner non-shape property;

a duct mating element having a second sealing surface which is substantially opposingly located from said first sealing surface when said duct is joined to said duct mating element;

means for joining said duct and said duct mating element while compressing a seal located between said sealing surfaces and while rotating said duct relative to said duct mating element; and at least one deformable seal element compressed between said first and said second sealing surfaces, said deformable seal element having a sealing surface slidably contacting said first sealing surface at a slidable interface; and comprising a sealing apparatus a landing ring portion attached to a single seal element portion.

12. A connector apparatus for containing a fluid, the apparatus comprising:

a duct having an interior passageway;

a rigid end ring element attached proximate to at least one end of a brittle liner substantially covering said interior passageway, said end ring element having a first sealing surface and wherein said end ring element has at least one non-shape property different from said brittle liner non-shape property;

a duct mating element having a second sealing surface which is substantially opposingly located from said first sealing surface when said duct is joined to said duct mating element;

means for joining said duct and said duct mating element while compressing a seal located between said sealing surfaces and while rotating said duct relative to said duct mating element; and at least one deformable seal element compressed between said first and said second sealing surfaces, said deformable seal element having a sealing surface slidably contacting said first sealing surface at a slidable interface, wherein a landing ring is located between said first and said second pipe sections and wherein said at least one non-shape property of said end ring element is hardness.

\* \* \* \* \*

UNITED STATES PATENT AND TRADEMARK OFFICE
CERTIFICATE OF CORRECTION

PATENT NO. : 5,779,276
DATED : July 14, 1998
INVENTOR(S) : William C. Allen

It is certified that error appears in the above-indentified patent and that said Letters Patent is hereby corrected as shown below:

Column 8, lines 14 and 17 (both occurrences), delete "35a" and insert -- 35b --.

Claim 11, column 16, line 15, delete "comprising a sealing apparatus".

Signed and Sealed this

Twenty-fifth Day of May, 1999

Attest:

Q. TODD DICKINSON

*Attesting Officer*      *Acting Commissioner of Patents and Trademarks*